US006280833B1

(12) United States Patent
Peiffer et al.

(10) Patent No.: US 6,280,833 B1
(45) Date of Patent: Aug. 28, 2001

(54) BIAXIALLY ORIENTED POLYPROPYLENE FILM HAVING MORE THAN ONE LAYER, ITS USE, AND PROCESS FOR ITS PRODUCTION

(75) Inventors: Herbert Peiffer, Mainz; Gottfried Hilkert, Saulheim, both of (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 09/364,049

(22) Filed: Jul. 30, 1999

(30) Foreign Application Priority Data

Jul. 31, 1998 (DE) .............................. 198 34 602

(51) Int. Cl.$^7$ .............................. B32B 27/32; B32B 15/08
(52) U.S. Cl. ........................ 428/213; 428/35.2; 428/35.3; 428/461; 428/519; 428/910; 426/106; 426/126; 426/127; 264/173.15; 264/173.19; 156/244.24
(58) Field of Search ..................... 428/516, 910, 428/409, 461, 213, 35.2, 35.3; 264/173.15, 173.19; 426/127, 126, 106; 156/244.24

(56) References Cited

U.S. PATENT DOCUMENTS

| 3,515,626 | 6/1970 | Duffield ............................. 428/325 |
| 3,958,064 | 5/1976 | Brekken et al. ..................... 428/407 |
| 4,042,569 | 8/1977 | Bell et al. ........................... 528/272 |
| 4,252,885 | 2/1981 | McGrail et al. ..................... 430/160 |
| 4,399,179 | 8/1983 | Minami et al. ...................... 428/212 |
| 4,493,872 | 1/1985 | Funderburk et al. ................ 428/332 |
| 4,615,939 | 10/1986 | Corsi et al. ......................... 428/323 |
| 4,622,237 | 11/1986 | Lori ..................................... 427/446 |
| 5,236,680 | 8/1993 | Nakazawa et al. ............... 423/328.1 |
| 5,236,683 | 8/1993 | Nakazawa et al. .................. 423/335 |
| 5,242,757 | 9/1993 | Buisine et al. ...................... 428/480 |
| 5,429,785 | 7/1995 | Jolliffe ................................ 264/216 |
| 5,443,915 * | 8/1995 | Wilkie et al. ....................... 428/461 |
| 5,453,260 | 9/1995 | Nakazawa et al. ............... 423/327.1 |
| 5,468,527 | 11/1995 | Peiffer et al. ....................... 428/35.7 |
| 5,506,014 | 4/1996 | Minnick ............................. 428/35.7 |
| 5,972,496 * | 10/1999 | Bader et al. ........................ 428/331 |

FOREIGN PATENT DOCUMENTS

| 1694404 | 4/1971 | (DE) . |
| 2230970 | 2/1973 | (DE) . |
| 3801535 | 7/1988 | (DE) . |
| 4306155 | 9/1994 | (DE) . |
| 0 035 835 | 9/1981 | (EP) . |
| 0 061 769 | 10/1982 | (EP) . |
| 0 088 635 | 9/1983 | (EP) . |
| 0 124 291 | 11/1984 | (EP) . |
| 0 135 451 | 3/1985 | (EP) . |
| 0 144 878 | 6/1985 | (EP) . |
| 0 236 945 | 9/1987 | (EP) . |
| 0 296 620 | 12/1988 | (EP) . |
| 0 347 646 | 12/1989 | (EP) . |
| 0 378 154 | 7/1990 | (EP) . |
| 0 378 955 | 7/1990 | (EP) . |
| 0 402 861 | 12/1990 | (EP) . |
| 0 490 665 | 6/1992 | (EP) . |
| 0 502 745 | 9/1992 | (EP) . |
| 0 514 129 | 11/1992 | (EP) . |
| 0 515 096 | 11/1992 | (EP) . |
| 0 580 404 | 1/1994 | (EP) . |
| 0 602 964 | 6/1994 | (EP) . |
| 0 604 057 | 6/1994 | (EP) . |
| 0 609 060 | 8/1994 | (EP) . |
| 0 612 790 | 8/1994 | (EP) . |
| 0 659 810 | 6/1995 | (EP) . |
| 0 663 286 | 7/1995 | (EP) . |
| 0 685 509 | 12/1995 | (EP) . |
| 0 707 979 | 4/1996 | (EP) . |
| 0 826 478 | 3/1998 | (EP) . |
| WO 94/13476 | 6/1994 | (WO) . |
| WO 94/13481 | 6/1994 | (WO) . |
| WO 98/13414 | 4/1998 | (WO) . |
| WO 98/13415 | 4/1998 | (WO) . |
| WO 88/10188 | 12/1998 | (WO) . |

OTHER PUBLICATIONS

Barendrecht, W., et al., *Harze natürliche*, in Ullmann's Encyklopädie der Techn. Chemie [Ullman's Encyclopedia of Industrial Chemistry] 4$^{th}$ Ed., vol. 12, pp 525–554. (Ullman ed., 1976).

Utz, H., Barriereeigenschaften Aluminiumbedampfter Kunststoffolien [Barrier Properties of Aluminum–Metalized Plastic Film] 66–68 (1995)(Unpublished dissertation, Technishe Universität (Munich)).

Kimura, S.F. et al., FTIR Spectroscopic Study on Crystallization Process of Poly (ethylene–2,6–naphthalate), 35 Journal of Polymer Science: Polymer Physics 2741–2747 (1997).

Bursch et al., "Biaxially Oriented Polyester Film for SMD Condensers—Made by Extrusion Followed by Biaxial Stretching and Heat Fixing to Give Specified Shrinkage Parameters in the Machine Direction and Transverse Direction." Derwent Abstract, WPI Acc. No. 98–194495/199818 (1998).

Database WPI, Section Ch, Week 9615, Derwent Publications Ltd., London, GB; Class A23, AN 96–148338, XP002114377 & JP 08 03679 A (Toray Indus., Inc.)(Feb. 6, 1996).

(List continued on next page.)

*Primary Examiner*—Paul Thibodeau
*Assistant Examiner*—D. Lawrence Tarazano
(74) *Attorney, Agent, or Firm*—Finnegan, Henderson, Farabow, Garrett & Dunner, L.L.P.

(57) ABSTRACT

The invention relates to a biaxially oriented polypropylene film which has very good optical properties and good processing performance and which, after it has been metallized or has been coated with oxidic materials, has a high oxygen barrier value, and whose structure has at least one base layer B and at least one layer A applied to this base layer, where this layer A has a specified number of elevations of specified height and specified diameter. The invention further relates to the use of the film and to a process for its production.

21 Claims, No Drawings

OTHER PUBLICATIONS

Database WPI, Section Ch, Week 9522, Derwent Publications Ltd., London, GB; Class A32, AN 95–166886, XP002114408 & JP 07 088592 A (Toray Indus., Inc.) (Apr. 4, 1995).

Weiss, J., Parameters that influence the barrier properties of metallized polyester and polypropylene films, 204 Thin Solid Films 203–216 (1991).

* cited by examiner

BIAXIALLY ORIENTED POLYPROPYLENE FILM HAVING MORE THAN ONE LAYER, ITS USE, AND PROCESS FOR ITS PRODUCTION

The invention relates to a biaxially oriented polypropylene film which has good optical properties and which, after it has been metallized or has been coated with oxidic materials, has a high oxygen barrier value, and whose structure has at least one base layer B and at least one layer A applied to this base layer, where this layer A has a specified number of elevations of specified height and specified diameter. The invention further relates to the use of the film and to a process for its production.

BACKGROUND OF THE INVENTION

1. Field of the Invention

Biaxially oriented polypropylene films are used in packaging and in industrial sectors, especially where there is a need for their advantageous properties, i.e. good optical properties, high mechanical strengths, good barrier action, in particular with respect to gases, good dimensional stability when heated and excellent layflat.

For most applications it is moreover desirable, e.g. for reasons of promotional effectiveness, to improve the optical properties of the polypropylene film, in particular its gloss and haze, while retaining its good processability. It is likewise desirable to improve the barrier properties of polypropylene films, for example to gain new applications.

2. Description of Related Arts

The prior art describes how the optical properties, in particular the gloss and haze, of biaxially oriented polypropylene film can be improved.

DE-A 43 06 155 describes a non-sealable, transparent, oriented polyolefin film having more than one layer, with a base layer and with at least one non-sealable outer layer made from polypropylene, where the outer layer comprises silicon particles which have had an organic aftertreatment and have an average particle diameter of from 2 to 6 $\mu$m.

The haze and processing properties of the film are improved, but the text has no teaching, concerning improvement of the barrier properties of the film. Nor does it give any kind of indication as to how the topography of a film of this type should be adjusted for simultaneous improvement of gloss and oxygen barrier.

In packaging applications for food and drink, high barrier effectiveness against gases, water vapor and flavors is generally demanded (this having the same significance as low permeation). A well known process for producing packaging of this type consists in high-vacuum aluminum metallizing of the plastic films used for this purpose. Other well known processes consist in coating the films with oxidic materials (e.g. $SiO_x$ or $Al_xO_y$) or with water glass. Essentially, the coatings used are transparent.

The effectiveness of the barrier against the substances mentioned above depends essentially on the type of the polymers in the film and the quality of the barrier layers applied. Thus, very high barrier effectiveness against gases, such as oxygen and flavors, is achieved in metallized, biaxially oriented polyester films. An effective barrier against water vapor is best achieved in metallized, biaxially oriented polypropylene films. There are other applications in which both a very effective water vapor barrier and an acceptable oxygen barrier are desirable.

In the prior art, there is neither sufficient knowledge of the detailed basis for the barrier effect in metallized or oxidically coated polypropylene films nor of how this may be decisively improved. Variables which are clearly important are the substrate surface, the type of substrate polymer and its morphology. It is generally assumed that smooth substrate surfaces result in better barrier properties.

The dissertation by H. Utz (Technische Universität München, 1995: "Barriereeigenschaften Aluminiumbedampfter Kunststoffolien" [Barrier Properties of Aluminum-Metallized Plastic Films]) gives detailed results of investigations on the influence of substrate surface on barrier properties in various plastic films.

DESCRIPTION OF THE INVENTION

It was an object of the present invention to provide a coextruded, biaxially oriented polypropylene film which has very good optical properties, i.e. reduced haze and in particular high gloss, at least on one surface of the film (called film surface A below). A surface A of this type would be, for example, particularly advantageous for printing or metallizing. The high gloss of the film is transferred to the print or to the metallic layer and thus gives the packaging a particularly lustrous appearance.

After metallization or after coating with oxidic materials on surface A the film should also have an oxygen barrier value better than in the prior art, and it should be easy to produce and to process. In summary, the object is to provide a film with the following combination of features:

high gloss, in particular on film surface A
low haze and
low oxygen permeation of the film after metallization or after coating with oxidic materials on film surface A.

The gloss of film surface A should be greater than 120 and the haze of the film should be less than 2.0.

Low oxygen permeation means in the present case that less than 30 $cm^3$ of oxygen per square meter and per day should diffuse through the metallized film when it is exposed to air at a pressure of 1 bar.

The other properties of the film should be at least equivalent to those of known packaging films of this type. It should, for example, be simple and cost-effective to produce and be easy to process on conventional machinery (i.e. the films should not block, for example).

The object is achieved by means of a coextruded, biaxially oriented polypropylene film having a base layer B, at least 80% by weight of which is composed of thermoplastic polypropylene, and having one or more other layers, where at least one outward-facing layer A has a number of elevations/protrusions N per $mm^2$ of film surface area which is related to their respective heights h and diameters d by the following equations $$\log N/mm^2 < A_h - B_h * \log h/\mu m, \quad 0.05\ \mu m < h < 1.0\ \mu m \tag{1}$$

$A_h = 1.4;\ B_h = 2.5$ $$\log N/mm^2 < A_d - B_d * \log d/\mu m, \quad 0.2\ \mu m < d < 10.0\ \mu m \tag{2}$$

$A_d = 3.4;\ B_d = 2.4$

For the purposes of the present invention, elevations/protrusions are conical elevations/protrusions which project out of the flat film surface. To achieve high oxygen barrier values in metallized or oxidically coated films according to an object of the invention, the number of elevations/protrusions N per $mm^2$ of film surface area A must be less than a particular numerical value, as given by equations (1) and (2). This numerical value is uniquely given by the right-hand sides of equations (1) and (2) as a function of the height h and the diameter d of the elevations/protrusions.

Biaxially oriented polypropylene films described by the above equation have a relatively small number of elevations/ protrusions in the layer A to be metallized or oxidically coated. In the range h<0.5 μm, particularly in the range h<0.4 μm and very particularly in the range h<0.3 μm, the number of elevations/protrusions is markedly lower than known from the prior art.

If the number N of elevations per unit area on the film layer A to be metallized or oxidically coated is greater than the right-hand sides of equations (1) or (2), this implies higher oxygen permeation, which is undesirable with regard to the object of the present invention. In this case, furthermore, the gloss of the film surface (in the unmetallized or uncoated state) is no longer as high, and this too is undesirable with regard to the object of the present invention.

In a preferred embodiment of the novel film the constant $A_h$ of the above-mentioned equation (1) has the value 1.18, and in a particularly preferred embodiment it has the value 1.0. In a likewise preferred embodiment of the novel film the constant Bh in the above-mentioned equation (1) has the value 2.2, and in a particularly preferred embodiment it has the value 2.1.

In a preferred embodiment of the novel film the constant $A_d$ in the above-mentioned equation (2) has the value 3.0, and in a particularly preferred embodiment it has the value 2.6. In a likewise preferred embodiment the constant $B_d$ of the above-mentioned equation (2) has the value 2.3, and in a particularly preferred embodiment it has the value 2.2.

In the preferred and particularly preferred embodiments the layer A according to the invention has extremely few elevations/protrusions N per unit of surface area. In this case the metallized or oxidically coated film has particularly good oxygen barrier properties, and the values for the gloss of this side are extremely high.

According to the invention, the film has at least two layers. Its layers are then a layer B and the layer A. In a preferred embodiment of the invention the film has three layers and has the layer A on one side of the layer B (=base layer) and has, on the other side of the layer B, another layer C made from polypropylene and comprising the pigments required for producing and processing the film. In this case the two layers A and C form the outer layers A and C.

In principle a variety of raw materials may be used as materials for the various layers. However, it is preferable for the production of the individual layers to be based on polypropylene raw materials.

The base layer of the novel film having more than one layer comprises polyolefins, preferably propylene polymers, and other additives if desired, in effective amounts in each case. The base layer generally comprises at least 50% by weight of the propylene polymers, preferably from 75 to 100% by weight, in particular from 90 to 100% by weight, based in each case on the base layer.

The propylene polymer generally contains from 90 to 100% by weight of propylene units, preferably from 95 to 100% by weight, in particular from 98 to 100% by weight, and generally has a melting point of 120° C. or above, preferably from 150 to 170° C., and generally has a melt flow index of from 0.5 to 8 g/10 min, preferably from 2 to 5 g/10 min, at 230° C. and with a force of 21.6N (DIN 53 735). Preferred propylene polymers for the base layer are isotactic propylene homopolymers with an atactic proportion of 15% by weight or below, copolymers of ethylene and propylene with an ethylene content of 10% by weight or below, copolymers of propylene with $C_4$–$C_8$ α-olefins with an a-olefin content of 10% by weight or below, and terpolymers of propylene, ethylene and butylene with an ethylene content of 10% by weight or below and with a butylene content of 15% by weight or below, and particular preference is given to isotactic propylene homopolymer. The percentages by weight given relate to the respective polymer.

A mixture of the above-mentioned propylene homo- and/ or copolymers and/or terpolymers and other polyolefins, in particular made from monomers having from 2 to 6 carbon atoms, is also suitable if the mixture comprises at least 50% by weight of propylene polymer, in particular at least 75% by weight. Other polyolefins which are suitable in the polymer mixture are polyethylenes, in particular HDPE, LDPE and LLDPE if the proportion of these polyolefins, based on the polymer mixture, does not exceed 15% by weight in each case.

In a preferred embodiment of the novel film the propylene polymer of the base layer is eroxidically degraded.

A measure of the degree of degradation of the polymer is the degradation factor A, which gives the relative change in the melt flow index (in accordance with DIN 53 735) of the polypropylene, based on the starting polymer.

$A = MFI_1/MFI_2$ $MFI_1$ = Melt flow index of the propylene polymer before adding the organic peroxide $MFI_2$ = Melt flow index of the peroxidically degraded propylene polymer The degradation factor A of the propylene polymer used is generally in the range from 3 to 15, preferably from 6 to 10. Particularly preferred organic peroxides are dialkyl peroxides, where alkyl radicals are understood to be the usual saturated straight-chain or branched lower alkyl radicals having up to 6 carbon atoms. Particular preference is given to 2,5-dimethyl-2,5-di(tert-butylperoxy)hexane and di-tert-butyl peroxide.

The base layer may generally comprise effective amounts in each case of stabilizers and neutralizing agents, and also, if desired, lubricants, antistats and/or resins, including but not limited to hydrocarbon resins.

Preferred resins are in particular hydrocarbon resins. The hydrocarbon resins may be hydrogenated, to some extent or completely. Possible resins are in principle synthetic resins or resins from natural sources. It has proven particularly advantageous to use resins with a softening point above 80° C. (measured in accordance with DIN 1 995-U4 or ASTM E-28). Those with a softening point from 100 to 180° C., in particular from 120 to 160° C., are preferred. The resin is preferably incorporated into the film in the form of a masterbatch, which is added into the extruder (e.g. single-screw or cascade extruder). Examples of usual masterbatches are those comprising from 30 to 70% by weight, preferably 50% by weight, of propylene homopolymer and from 70 to 30% by weight, preferably 50% by weight, of hydrocarbon resin. The percentage by weight data are based on the total weight of propylene polymer and hydrocarbon resin.

Among the numerous resins, preference is given to hydrocarbon resins and specifically to petroleum resins, styrene resins, cyclopentadiene resins and terpene resins. These resins are described in Ullmanns Enzyklopädie der techn. Chemie [Ullman's Encyclopedia of Industrial Chemistry] 4th edition, Vol. 12, pages 525–555.

Petroleum resins are those hydrocarbon resins which are prepared by polymerizing deep-decomposed petroleum materials in the presence of a catalyst. These petroleum materials usually comprise a mixture of resin-forming substances, such as styrene, methylstyrene, vinyltoluene, indene, methylindene, butadiene, isoprene, piperylene and pentylene. The styrene resins are homopolymers of styrene or copolymers of styrene with other monomers, such as methylstyrene, vinyltoluene and butadiene. The cyclopentadiene resins are cyclopentadiene homopolymers or cyclopentadiene copolymers, obtained from coal-tar distillates and fractionated petroleum gas. These resins are prepared by holding the materials, which comprise cyclopentadiene, at a high temperature for a long period of time. Depending on the reaction temperature dimers, trimers or oligomers may be obtained.

The terpene resins are polymers of terpenes, i.e. of hydrocarbons of the formula $C_{10}H_{16}$ present in almost all essential oils and in oil-containing resins from plants, or are phenol-modified terpene resins. Specific examples of terpenes which may be mentioned are pinene, α-pinene, dipentene, limonene, myrcene, camphene and the like. The hydrocarbon resins may also be those known as modified hydrocarbon resins. The modification generally takes place by reacting the raw materials prior to polymerization, by introducing specific monomers or by reacting the polymerized product, in particular for hydrogenation or partial hydrogenation reactions.

Other hydrocarbon resins used are styrene homopolymers, styrene copolymers, cyclopentadiene homopolymers, cyclopentadiene copolymers and/or terpene polymers with a softening point above 100° C. in each case. In the case of the unsaturated polymers, the hydrogenated product is preferred. Very particular preference is given to using the cyclopentadiene polymers with a softening point of 140° C. and above in the base layer.

The novel polyolefin film comprises at least an outer layer A, which has been applied to the above-mentioned base layer B. For this outer layer use may in principle be made of the polymers used for the base layer. Other materials besides these may also be present in the outer layer, in which case the outer layer then is preferably composed of a mixture of polymers, a copolymer or a homopolymer.

The outer layer A according to the invention is generally composed of α-olefins having from 2 to 10 carbon atoms.
The outer layer generally comprises
a propylene homopolymer or
a copolymer of
  ethylene and propylene or
  ethylene and butylene or
  propylene and butylene or
  ethylene and another α-olefin having from 5 to 10 carbon atoms or
  propylene and another a-olefin having from 5 to 10 carbon atoms or a terpolymer of
  ethylene and propylene and butylene or
  ethylene and propylene and another α-olefin having from 5 to 10 carbon atoms or
a mixture made from two or more of the homo-, co- and terpolymers mentioned or
a blend made from two or more of the homo-, co- and terpolymers mentioned, if desired mixed with one or more of the homo-, co- and terpolymers mentioned.

The outer layer particularly preferably comprises essentially
a propylene homopolymer or
a copolymer of
  ethylene and propylene or
  ethylene and 1-butylene or
  propylene and 1-butylene or
a terpolymer of
  ethylene and propylene and 1-butylene or
a mixture made from two or more of the particularly preferred homo-, co- and terpolymers mentioned or
a blend made from two or more of the particularly preferred homo-, co- and terpolymers mentioned, if desired mixed with one or more of the homo-, co- and terpolymers mentioned,
and preference is given in particular to propylene homopolymers or
random ethylene-propylene copolymers with
  an ethylene content of from 1 to 10% by weight, preferably from 2 to 8% by weight, or
random propylene-1-butylene copolymers with
  a butylene content of from 4 to 25% by weight, preferably from 10 to 20% by weight,
based in each case on the total weight of the copolymer, or
random ethylene-propylene-1-butylene terpolymers with
  an ethylene content of from 1 to 10% by weight, preferably from 2 to 6% by weight, and
  a 1-butylene content of from 3 to 20% by weight, preferably from 8 to 10% by weight,
based in each case on the total weight of the terpolymer, or
a blend made from an ethylene-propylene-1-butylene terpolymer and a propylene-1-butylene copolymer
  with an ethylene content of from 0.1 to 7% by weight and a propylene content of from 50 to 90% by weight and a 1-butylene content of from 10 to 40% by weight, based in each case on the total weight of the polymer blend.

The propylene homopolymer used in the outer layer comprises predominantly (at least 90%) propylene and has a melting point of 140° C. or above, preferably from 150 to 170° C. Preference is given to isotactic homopolypropylene with an n-heptane-soluble fraction of 6% by weight or less, based on the isotactic homopolypropylene. The homopolymer of component I or the homopolymer present therein generally has a melt flow index of from 0.5 to 15 g/10 min, preferably from 2.0 to 10 g/10 min.

The copolymers used in the outer layer and described above generally have a melt flow index of from 2 to 20 g/10 min, preferably from 4 to 15 gl 0 min. The melting point is in the range from 120 to 140° C. The terpolymers used in the outer layer have a melt flow index in the range from 2 to 20 g/10 min, preferably from 4 to 15 g/10 min, and a melting point in the range from 120 to 140° C. The blend made from co- and terpolymers and described above has a melt flow index of from 5 to 9 g/10 min and a melting point of from 120 to 150° C. All of the melt flow indices given above are measured at 230° C. and with a load of 21.6 N (DIN 53 735).

If desired, the outer layer polymers may have been peroxidically degraded in the manner described above for the base layer, and in principle the same peroxides are used. The degradation factor for the outer layer polymers is generally in the range from 3 to 15, preferably from 6 to 10.

If desired, hydrocarbon resins may also be added to the outer layer(s) in the manner described above for the base layer. The outer layers generally comprise from 1 to 40% by weight of resin, in particular from 2 to 30% by weight, preferably from 3 to 20% by weight. Embodiments with resin-containing outer layers are particularly advantageous in respect of their optical properties, such as gloss and transparency, and in respect of their barrier properties to water vapor and oxygen. Resin-containing outer layers should generally comprise antiblocking agents to ensure easy passage through machinery.

The novel film having more than one layer comprises at least the base layer described above and at least one outer layer. Depending on its intended application, the film may have another outer layer C on the side of the base layer opposite to the outer layer A. If desired, one or more intermediate layers may also be applied between the base and outer layers.

Preferred embodiments of the film have three layers. The structure, thickness and composition of a second outer layer may be selected independently of the outer layer already present. The second outer layer may likewise comprise one of the polymers or polymer mixtures described above, but this does not have to be the same as that of the first outer layer. The second outer layer may, however, also comprise other polymers commonly used for an outer layer.

The thickness of the outer layer(s) is greater than 0.1 $\mu$m, preferably in the range from 0.2 to 5 $\mu$m, in particular from 0.4 to 3 $\mu$m, and if there are outer layers on both sides their thicknesses may be identical or different.

The total thickness of the novel polyolefin film having more than one layer may vary within wide limits and depends on the intended application. It is preferably from 3 to 100 $\mu$m, in particular from 8 to 60 $\mu$m, the base layer making up from about 50 to 96% of the total film thickness.

The density of the film is generally 0.9 g/cm$^2$ or above, preferably from 0.9 to 0.97 g/cm$^3$.

To improve the adhesive properties of the outer layer(s), at least one surface of the film may be corona- or flame-treated. If desired, identical or different treatments of this type may be carried out on both surfaces.

For yet further improvement in certain properties of the novel polyolefin film, either the base layer or the outer layer(s) may comprise an effective amount in each case of other additives, preferably antistatics (antistatic agents) and/or antiblocking agents and/or lubricants and/or stabilizers and/or neutralizing agents, compatible with the propylene polymers of the base layer and of the outer layer(s), except the antiblocking agents, which are generally incompatible. All of the amounts given in percentages by weight (percent by weight) in the following description are based on the respective layer or layers to which the additive may have been added.

Preferred antistats are alkali metal alkanesulfonates, polyether-modified (i.e. ethoxylated and/or propoxylated) polydiorganosiloxanes (polydialkylsiloxanes, polyalkylphenylsiloxanes and the like) and/or the essentially straight-chain and saturated aliphatic tertiary amines with an aliphatic radical having from 10 to 20 carbon atoms with substitution by hydroxy-$C_1$–$C_4$-alkyl groups. N,N-bis(2-hydroxyethyl)alkylamines having from 10 to 20 carbon atoms, preferably from 12 to 18 carbon atoms, in the alkyl radical are particularly suitable. Effective amounts of antistats are in the range from 0.005 to 0.5% by weight, and a preferred antistat is from 0.005 to 0.5% by weight of glycerol monostearate. To achieve good barrier values and good metal adhesion it is useful to keep the proportion of antistat low if possible, or even to dispense with antistat entirely.

Suitable antiblocking agents are inorganic additives, such as silica, calcium carbonate, magnesium silicate, aluminum silicate, calcium phosphate and the like and/or incompatible organic polymers, such as polyamides, polyesters, polycarbonates and the like. Preference is given to benzoguanamine-formaldehyde polymers, silica and calcium carbonate. Effective amounts of antiblocking agent are in the range from 0.001 to 2% by weight, preferably from 0.01 to 0.8% by weight. The average particle size is from 1 to 6 $\mu$m, in particular from 2 to 5 $\mu$m. Particles of globular shape, as described in EP-A-0 236 945 and DE-A-38 01 535, are particularly suitable. The antiblocking agents are preferably added to the outer layers.

To comply with equation (1) little or no inert pigment fillers are present in the layer A according to the invention. The concentration of inert particles in the layer A is from 0 to 0.08% by weight, preferably from 0 to 0.065% by weight, in particular from 0 to 0.05% by weight and very particularly from 0 to 0.04% by weight, and depends essentially on the size of the particles used. Preferred particles are $SiO_2$ in colloidal and chain form. There is in principle no restriction on the diameters of the particles used. However, to achieve the object it has proven useful to use particles with an average primary particle diameter of less than 60 nm, preferably less than 55 nm and particularly preferably less than 50 nm and/or particles with an average primary particle diameter of greater than 1 $\mu$m, preferably greater than 1.5 $\mu$m and particularly preferably greater than 2 $\mu$m.

The lubricants are amides of higher aliphatic acids, esters of higher aliphatic acids, waxes and metal soaps, and also polydimethylsiloxanes. Effective amounts of lubricants are in the range from 0.001 to 3% by weight, preferably from 0.002 to 1% by weight. Addition of amides of higher aliphatic acids in the range from 0.001 to 0.25% by weight in the base layer and/or in the outer layers is particularly suitable. A particularly suitable amide of an aliphatic acid is erucamide. To achieve good barrier values and good metal adhesion it is useful if lubricants can be substantially dispensed with.

Stabilizers which may be used are the usual stabilizing compounds for ethylene polymers, propylene polymers and other α-olefin polymers. The amounts of these added are from 0.05 to 2% by weight. Phenolic stabilizers, alkali metal/alkaline-earth metal stearates and/or alkali metal/alkaline-earth metal carbonates are particularly suitable.

Phenolic stabilizers are preferred in amounts of from 0.1 to 0.6% by weight, in particular from 0.15 to 0.3% by weight, and with molar masses above 500 g/mol. Pentaerythritol tetrakis-3-(3,5-di-tert-butyl-4-hydroxyphenyl) propionate or 1,3,5-trimethyl-2,4,6-tris(3,5-di-tert-butyl4-hydroxybenzyl)benzene are particularly advantageous.

Neutralizing agents are preferably calcium stearate and/or calcium carbonate of average particle size not more than 0.7 $\mu$m, absolute particle size less than 10 $\mu$m and specific surface area not less than 40 m$^2$/g.

In the particularly preferred embodiment the novel polypropylene film has a three-layer structure and thus also comprises a layer C. The two layers A and C then form the outer layers A and C. The structure, thickness and composition of the second outer layer C may be selected independently of the outer layer A already present. The second outer layer may likewise comprise the above-mentioned polymers or polymer mixtures, but these do not have to be the same as those of the first outer layer. This second outer layer generally comprises more pigments (i.e. higher concentrations of pigments) than does the first outer layer A according to the invention. The pigment concentration in this second outer layer is from 0.02 to 1.0%, advantageously from 0.025 to 0.8%, in particular from 0.03 to 0.6% and very particularly preferably from 0.035 to 0.5% depending, for example, on the processing behavior desired from the film. It is preferable to select the pigment type(s), the pigment concentration(s) and the particle concentration(s), and also the layer thickness ratios, in such a way as to give both good optical properties and easy production and processing of the film.

It has proven useful to describe the ease of production and processing of the film by using the following parameters for side C a) average roughness $R_{a,C}$
b) static/sliding friction coefficient $\mu_C$ of this side with respect to itself, and
c) number of elevations/protrusions $N_C/m^2$.

It is advantageous if the film is structured in such a way that on this surface C which is opposite to the outer layer according to the invention (or on B in the case of a two-layer film)

a) the $R_a$ value is from 20 to 300 nm
b) the static/sliding friction coefficient $\mu_C$ of this layer with respect to itself is less than 0.5 and
c) the number of elevations/protrusions $N_C/mm^2$ is expressed by the equations $$A_{h2}-B_{h2}*\log h/\mu m < N_C/mm^2 < A_{h3}-B_{h3}*\log h/\mu m \quad (3)$$

0.05 $\mu$m<h<1.0 $\mu$m
$A_{h2}$=−1.000
$B_{h2}$=3.70
$A_{h3}$=2.477
$B_{h3}$=2.22

$$A_{d2}-B_{d2}*\log d/\mu m < N_C/mm^2 < A_{d3}-B_{d3}*\log d/\mu m \quad (4)$$

0.2 $\mu$m<d<10 $\mu$m
$A_{d2}$=−1.700
$B_{d2}$=3.86
$A_{d3}$=4.700
$B_{d3}$=2.70.

In a preferred embodiment $R_a$ is from 30 to 250 nm, in particular from 35 to 200 nm.

In a preferred embodiment the static/sliding friction coefficient $\mu_C$ of this layer with respect to itself is less than 0.45 and in particular less than 0.40.

In a preferred embodiment the constants $A_{h2}$ to $B_{h3}$ in equation (3) have the values $A_{h2}$=−0.523, $B_{h2}$=3.523, $A_{h3}$=2.300 and $B_{h3}$=2.3, and in a particularly preferred embodiment the values are $A_{h2}$=0.00, $B_{h2}$=3.300, $A_{h3}$=2.000 and $B_{h3}$=2.400, and very p preferably $A_{h2}$=1.420, $B_{h2}$=2.500, $A_{h3}$=2.000 and $B_{h3}$=3.000. In a preferred embodiment the constants $A_{d2}$ to $B_{d3}$ in equation (4) have the values $A_{d2}$=2.00, $B_{d2}$=3.630, $A_{d3}$=4.40 and $B_{d3}$=2.70, and in a particularly preferred embodiment the values are $A_{d2}$=2.400, $B_{d2}$=3.720, $A_{d3}$=4.000 and $B_{d3}$=2.600, and very preferably $A_{d2}$=3.400, $B_{d2}$=2.400, $A_{d3}$=4.000 and $B_{d3}$=3.300.

If desired, there may also be an intermediate layer between the base layer and the outer layer(s). This again may be composed of the polymers described for the base layers. In a particularly preferred embodiment it is composed of the polypropylene used for the base layer. It may also comprise the usual additives described. The thickness of the intermediate layer is generally greater than 0.3 $\mu$m, preferably from 0.5 to 15 $\mu$m, in particular from 1.0 to 10 $\mu$m and very particularly preferably from 1.0 to 5 $\mu$m.

In the particularly advantageous three-layer embodiment of the novel film the thickness of the outer layer(s) A (and C) is generally greater than 0.1 $\mu$m, preferably from 0.2 to 3.0 $\mu$m, advantageously from 0.2 to 2.5 $\mu$m, particularly from 0.3 to 2 $\mu$m and very particularly preferably from 0.3 to 1.5 $\mu$m, and the outer layers A and C may have identical or different thicknesses.

The invention further relates to a process for producing the novel film having more than one layer by coextrusion processes known per se.

For the purposes of this process the procedure is to coextrude, through a flat-film die, the melts corresponding to the individual layers of the film, to take off the resultant film on one or more rolls to solidify the same, and then to stretch (orient) the film biaxially, to heat-set the biaxially stretched film and, if desired, to corona-treat the surface layer intended for corona-treatment.

The biaxial stretching (orientation) is generally carried out sequentially, and preference is given to sequential biaxial stretching which begins with longitudinal (machine-direction) stretching, followed by transverse stretching (perpendicular to the machine direction).

The polymer or polymer mixture for the individual layers is usually firstly compressed and plasticized in an extruder as in the coextrusion process, where the polymer or polymer mixture may by this time comprise any additives added. In particular the resins are preferably added in the form of a masterbatch. The melts are then simultaneously extruded through a flat-film die and the coextruded film is then taken off on one or more take-off rolls, whereupon it cools and solidifies.

The resultant film is then stretched longitudinally and transversely to the extrusion direction, and this causes orientation of the molecular chains. Longitudinal stretching is usefully carried out with the aid of two rolls running at different speeds corresponding to the stretching ratio desired, and transverse stretching with the aid of an appropriate tenter frame. Longitudinal stretching ratios according to the invention are from 4.0 to 9, preferably from 4.5 to 8.0. Transverse stretching ratios should then be selected correspondingly, giving preferably a range of from 5.0 to 11.0.

Biaxial stretching of the film is followed by its heat-setting (heat treatment), where the film is held at a temperature of from 100 to 160° C. for from approximately 0.1 to 10 s. The film is then wound up in a usual manner using wind-up equipment.

It has proven particularly useful for the take-off roll(s) which cool and solidify the extruded film to be maintained at a temperature of from 10 to 100° C., preferably from 20 to 70° C., by means of a heating and cooling circuit.

The temperatures at which longitudinal and transverse stretching are carried out may vary over a relatively wide range and depend on the composition of the base layer mixture and, respectively, of the outer layer mixture, and on the desired properties of the film. In general, longitudinal stretching is preferably carried out at from 80 to 150° C. and transverse stretching preferably at from 120 to 170° C.

As mentioned above, one or both surfaces of the film may be corona- or flame-treated by one of the known methods after biaxial stretching, if desired. The intensity of the treatment is generally in the range from 37 to 50 mN/m, preferably from 38 to 45 mN/m.

A useful procedure for the corona-treatment is to pass the film between two conductors serving as electrodes, where the voltage applied between the electrodes, mostly an alternating voltage (from about 5 to 20 kV and from 5 to 30 kHz), is sufficiently high to allow corona discharges to take place. The corona discharge ionizes the air above the film surface and this reacts with the molecules of the film surface in such a way as to produce polar inclusions in the essentially nonpolar polymer matrix.

For flame treatment with a polarized flame (cf. U.S. Pat. No. 4,622,237) a direct voltage is applied between a burner (negative pole) and a cooling roll. The magnitude of the voltage applied is from 400 to 3000 V, preferably from 500 to 2000 V. The voltage applied increases the acceleration of the ionized atoms and the kinetic energy with which they impact the polymer surface. It becomes easier to break the chemical bonds within the polymer molecule, and free-radical formation proceeds more rapidly.

In the case of metallization of the film on the layer A according to the invention, the metal layer is preferably composed of aluminum. However, other materials which can be applied as a thin and coherent layer are also suitable. A particular example of a suitable material is silicon, which unlike aluminum gives a transparent barrier layer. The oxidic layer is preferably composed of oxides of elements of the 2nd, 3rd or 4th main group of the Periodic Table, in particular oxides of magnesium, of aluminum or of silicon. The metallic or oxidic materials used are generally those which can be applied at reduced pressure or in vacuo. The thickness of the layer applied is generally from 10 to 100 nm.

An advantage of the invention is that the production costs of the novel film are comparable with those of the prior art. The other properties of the novel film relevant to processing and use are essentially unchanged or even improved. In addition, recycled material can always be reused in producing the film at concentrations of from 10 to 50% by weight, preferably 20 to 50% by weight, based on the total weight of the film, without any significant adverse effect on the physical properties of the film. The film is highly suitable for packaging foodstuffs and other consumable items which may be damaged by light and/or by air.

In summary, the novel film has high gloss, in particular high gloss on film surface A, and low haze. The film also has an excellent oxygen barrier value once film surface A has been metallized or has been coated with oxidic materials. In addition, it has good winding and processing performance.

The gloss of film surface A is greater than 120. In a preferred embodiment the gloss of this side is greater than 125, and in a particularly preferred embodiment it is greater than 130.

This film surface is therefore particularly suitable for printing or for metallizing. The high gloss of the film transfers to the print or to the metal layer applied and thus gives the film the desired appearance, effective for promotional purposes.

The haze of the film is less than 3.0. In a preferred embodiment the haze of the film is less than 2.5, and in a particularly preferred embodiment it is less than 2.0.

Once it has been metallized on film surface A, the film has an oxygen barrier value of less than 30 $cm^3$ $m^{-2}$ $d^{-1}$ $bar^{-1}$, preferably less than 25 $cm^3$ $m^{-2}$ $d^{-1}$ $bar^{-1}$ and particularly preferably less than 20 $cm^3$ $m^{-2}$ $d^{-1}$ $bar^{-1}$.

The coefficient of friction on the side opposite to side A is less than 0.5. In a preferred embodiment this coefficient of friction of the film is less than 0.45, and in a particularly preferred embodiment it is less than 0.4.

Table 1 below shows once again the most important properties of the films according to the invention.

TABLE 1

|  | Range according to the invention | Preferred | Particularly preferred | Unit | Method of measurement |
|---|---|---|---|---|---|
| Gloss on side A (20° angle of measurement[i]) | >120 | >125 | >130 |  | DIN 67 530 |
| Haze[i] | <3.0 | <2.5 | <2.3 | % | ASTM-D 1003-52 |
| Oxygen permeation of metallized or oxidically coated film | <30 | <25 | <20 | $cm^3$ $m^{-2}$ $d^{-1}$ $bar^{-1}$ | DIN 53 380, Part 3 |
| Coefficient of friction of side C or (as appropriate) B, with respect to itself | <0.5 | <0.45 | <0.40 |  | DIN 53 375 |
| Average roughness $R_a$ of side C or (as appropriate) B | 20–300 | 30–250 | 35–200 | nm | DIN 4768 with a cut-off of 0.25 mm |

[i]Measured on the unmetallized film

The following methods were used to determine parameters for the raw materials and the films:

(1) Optical Density

The Macbeth TD-904 Densitometer from Macbeth (Division of Kollmorgen Instruments Corp.) was used to measure the optical density. The optical density is defined as OD=–Ig $I/I_0$, where I is the intensity of the incident light, $I_0$ is the intensity of the transmitted light and $I/I_0$ is the transmittance.

(2) Oxygen Barrier

The oxygen barrier of the metallized films was measured using an OX-TRAN 2/20 from Mocon Modern Controls (USA) in accordance with DIN 53 380, Part 3.

(3) Coefficient of Friction

The coefficient of friction was determined according to DIN 53 375, the coefficient of sliding friction being measured 14 days after production. (4) Surface Tension Surface tension was determined using the "ink method" (DIN 53 364).

(5) Haze

The haze of the film was measured according to ASTM-D 1003-52. The Holz haze was determined by a method based on ASTM-D 1003-52, but in order to utilize the most effective measurement range measurements were made on four pieces of film laid one on top of the other, and a 1° slit diaphragm was used instead of a 4° pinhole.

(6) Gloss

Gloss was measured according to DIN 67 530. The reflectance was measured as a characteristic optical value for a film surface. Based on the standards ASTM-D 523-78 and ISO 2813 the angle of incidence was set at 20° or 60°. A beam of light hits the flat test surface at the set angle of incidence and is reflected and/or scattered thereby. A proportional electrical variable is displayed representing the light beams hitting the photoelectric detector. The value measured is dimensionless and must be stated together with the angle of incidence.

(7) Determination of the Particle Sizes on Film Surfaces

A scanning electron microscope (e.g. DSM 982 Gemini, Leo GmbH (Zeiss)) together with an image analysis system was used to determine the size distribution of particles of antiblocking agent (particle size distribution) on film surfaces. The magnification selected in all cases was 1700.

For these measurements specimens of film are placed flat on a specimen holder. These are then metallized obliquely at an angle a with a thin metallic layer (e.g. of silver). a here is the angle between the surface of the specimen and the direction of diffusion of the metal vapor. The antiblocking agent particles throw a shadow in this oblique metallization. Since the shadows are not at this stage electrically conductive the specimen can then be further metallized with a second metal (e.g. gold), the metal vapor here impacting vertically onto the surface of the specimen.

Scanning electron microscope (SEM) images are taken of specimen surfaces prepared in this way. The shadows of the particles of antiblocking agent are visible due to the contrast between materials. The specimen is oriented in the SEM so that the shadows run parallel to the lower edge of the image (x direction). SEM images are taken with this setting and transferred to an image analysis system, which is used to make precise measurements of the lengths of the shadows (in the x direction) and their maximum extent in the y direction (parallel to the vertical edge of the image).

The diameter D of the particles of antiblocking agent at the surface level of the specimen is equal to the maximum extent of the shadows d in the y direction. The height of the particles of antiblocking agent, measured from the film surface, can be calculated from the angle α of metallization and the length L of the shadows, given knowledge of the magnification V selected for the SEM image:

$$h = (\tan(\alpha)) * L / V$$

So as to achieve a sufficiently high level of statistical reliability precise measurements are made on a few thousand particles of antiblocking agent. Using known statistical methods, frequency distributions are then produced for the diameters and heights of the particles. The class interval selected for this is 0.2 μm for particle diameter D and 0.05 μm for particle height h.

(8) Roughness

The roughness $R_a$ of the film was determined in accordance with DIN 4768 with a cut-off of 0.25 mm.

(9) Melt Flow Index

Measurement of melt flow index was based on DIN 53 735, with a load of 21.6 N at 230° C. and, respectively, 50 N at 190° C.

(10) Melting Point

DSC measurement, maximum of melting curve, heating rate 20° C./min.

EXAMPLE 1

Coextrusion, followed by stepwise orientation in longitudinal and transverse directions, was used to produce a transparent three-layer film with ABC structure and total thickness 20 μm. The thickness of each layer is given in Table 2.

Outer layer A was a mixture made from:
94.0% by weight of isotactic polypropylene with an MFI of 4 g/10 min, and
6.00% by weight of masterbatch made from 99.0% by weight of polypropylene with an MFI of 4 g/10 min, 0.5% by weight of Sylobloc® 44 (colloidal $SiO_2$ from Grace) and 0.5% by weight of Aerosil® TT 600 ($SiO_2$ in chain form from Degussa).

Base layer B:
99.8% by weight of polypropylene with an MFI of 4 g/10 min, and
0.2% by weight of N,N-bisethoxyalkylamine Outer layer C was a mixture made from:
84.0% by weight of isotactic polypropylene with an MFI of 4 g/10 min, and
16.00% by weight of masterbatch made from 99.0% by weight of polypropylene with an MFI of 4 g/10 min, 0.5% by weight of Sylobloc® 44 (colloidal $SiO_2$ from Grace) and 0.5% by weight of Aerosil® TT 600 ($SiO_2$ in chain form from Degussa).

Process conditions in the individual steps were:

| Extrusion | Temperatures | |
|---|---|---|
| | Layer A | 270° C. |
| | Layer B | 270° C. |
| | Layer C | 270° C. |
| | Die gap width | 1 mm |
| | Temperature of take-off roll | 30° C. |
| Longitudinal stretching | Temperature | 80–140° C. |
| Longitudinal stretching ratio | 5.0 | |
| Transverse stretching | Temperature | 160° C. |
| Transverse stretching ratio | 10.0 | |
| Setting | Temperature | 150° C. |
| Duration | | 2 s |

The film has very good optical properties and good processing performance (cf. Table 3).

After the film had been produced (as in this example and in all of the examples below) its side A was metallized with aluminum in vacuo in an industrial metallizer. The coating rate was 8 m/s and the optical density was 2.6.

The film had the required high oxygen barrier value. The structure of the film and the properties achieved with films produced in this way are given in Tables 2 and 3.

EXAMPLE 2

Coextrusion, followed by stepwise orientation in longitudinal and transverse directions, was used to produce a transparent three-layer film with ABC structure and an overall thickness of 20 μm, in a similar manner to that of Example 1. The only change compared with Example 1 was the outer layer A.

Outer layer A was a mixture made from:
98.0% by weight of isotactic polypropylene with an MFI of 4 g/10 min, and
2.00% by weight of masterbatch made from 99.0% by weight of polypropylene with an MFI of 4 g/10 min, 0.5% by weight of Sylobloc® 44 H (colloidal $SiO_2$ from Grace) and 0.5% by weight of Aerosil® TT 600 ($SiO_2$ in chain form from Degussa).

The processing conditions selected for all of the layers were as in Example 1.

EXAMPLE 3

Coextrusion, followed by stepwise orientation in longitudinal and transverse directions, was used to produce a transparent three-layer film with ABC structure and an overall thickness of 20 μm, in a similar manner to that of Example 2. The only change compared with Example 2 was the outer layer A.

Outer layer A was a mixture made from:
88.0% by weight of isotactic polypropylene with an MFI of 4 g/10 min, and
10.0% by weight of hydrocarbon resin (Regalreze 1139 from Hercules Inc.) with a softening point of 140° C. and a molecular weight of 2500, and 2.00% by weight of masterbatch made from 99.0% by weight of polypropylene with an MFI of 4 g/10 min, 0.5% by weight of Sylobloc® 44 H (colloidal SiO$_2$ from Grace) and 0.5% by weight of Aerosil® TT 600 (SiO$_2$ in chain form from Degussa).

The processing conditions selected for all of the layers were as in Example 1.

EXAMPLE 4

Coextrusion, followed by stepwise orientation in longitudinal and transverse directions, was used to produce a transparent three-layer film with ABC structure and an overall thickness of 20 μm, in a similar manner to that of Example 2. The only change compared with Example 2 was the base layer B.

Base layer B was a mixture made from:

89.8% by weight of polypropylene with an MFI of 4 g/10 min, and 0.2% by weight of N,N-bisethoxyalkylamine 10.0% by weight of hydrocarbon resin (Regalrez® 1139 from Hercules Inc.) with a softening point of 140° C. and a molecular weight of 2500.

What is claimed is:

1. A biaxially oriented, coextruded polypropylene film comprising:
   (A) a base layer B, at least 80% by weight of which is composed of thermoplastic polypropylene; and
   (B) one or more additional layers,
wherein at least one outward-facing layer A has a number of elevations/protrusions N per mm$^2$ of film surface area which is related to their respective heights h and diameters d by the following equations $$\log N/mm^2 < A_h - B_h * \log h/\mu m, \quad 0.05 \, \mu m < h < 1.0 \, \mu m \quad (1)$$

$$A_h = 1.4; \; B_h = 2.5$$

$$\log N/mm^2 < A_d - B_d * \log d/\mu m, \quad 0.2 \, \mu m < d < 10 \, \mu m \quad (2)$$

$$A_d = 3.4; \; B_d = 2.4$$

2. The polypropylene film of claim 1, wherein the layer A comprises less than 0.1% by weight of an inert filler.

3. The polypropylene film of claim 1, wherein the thickness of the outward-facing layer A is from 0.1 to 5.0 μm.

4. The polypropylene film of claim 1, wherein the film has a two-layer structure and is composed of the base layer B and the outer layer A.

TABLE 2

| Example | thickness μm | Film structure | Layer thickness A B C μm | Pigments in the layers A | B | C | Average pigment diameter A B C μm | | | Pigment concentrations A B C ppm | | |
|---|---|---|---|---|---|---|---|---|---|---|---|---|
| Example 1 | 20 | ABC | 1.0/18.0/1.0 | Sylobloc ® 44 Aerosil ® TT 600 | none | Sylobloc ® 44 Aerosil ® TT 600 | 2.5 0.04 | 2.5 0.04 | | 300 300 | 0 0 | 800 800 |
| Example 2 | 20 | ABC | 1.0/18.0/1.0 | Sylobloc ® 44 Aerosil ® TT 600 | none | Sylobloc ® 44 Aerosil ® TT 600 | 2.5 0.04 | 2.5 0.04 | | 100 100 | 0 0 | 800 800 |
| Example 3 | 20 | ABC | 1.0/18.0/1.0 | Sylobloc ® 44 Aerosil ® TT 600 | none | Sylobloc ® 44 Aerosil ® TT 600 | 2.5 0.04 | 2.5 0.04 | | 100 100 | 0 0 | 800 800 |
| Example 4 | 20 | ABC | 1.0/18.0/1.0 | Sylobloc ® 44 Aerosil ® TT 600 | none | Sylobloc ® 44 Aerosil ® TT 600 | 2.5 0.04 | 2.5 0.04 | | 100 100 | 0 0 | 800 800 |
| Comparative example | 20 | ABC | 1.0/18.0/1.0 | Sylobloc ® 44 Aerosil ® TT 600 | none | Sylobloc ® 44 Aerosil ® TT 600 | 2.5 0.04 | 2.5 0.04 | | 1200 1000 | 0 0 | 800 800 |

TABLE 3

| Example | Constants for height distribution of particles $A_h$ Side A/Side C | $B_h$ Side A/Side C | Constants for thickness distribution of particles $A_d$ Side A/Side C | $B_d$ Side A/Side C | Oxygen barrier values cm$^3$/(m$^2$ bar d) | Coefficient of friction μk A/A | C/C | Roughness $R_a$ Side A mm | Side C | Gloss[1] Side A | Side C | Haze[1] % | Processing performance |
|---|---|---|---|---|---|---|---|---|---|---|---|---|---|
| Example 1 | 1.3/2.45 | 1.5/2.6 | 3.3/2.4 | 3.5/3.1 | 28 | 0.6 | 0.4 | 30 | 60 | 122 | 115 | 1.9 | very good |
| Example 2 | 1.25/2.4 | 1.5/2.6 | 3.2/2.3 | 3.5/3.1 | 27 | 0.65 | 0.4 | 25 | 60 | 125 | 115 | 1.8 | very good |
| Example 3 | 1.25/2.4 | 1.5/2.6 | 3.18/2.3 | 3.5/3.1 | 20 | 0.75 | 0.4 | 25 | 60 | 130 | 115 | 1.6 | very good |
| Example 4 | 1.24/2.4 | 1.5/2.6 | 3.15/2.3 | 3.5/3.1 | 25 | 0.8 | 0.4 | 20 | 60 | 135 | 115 | 1.5 | good |
| Comparative example | 1.6/2.9 | 1.5/2.6 | 3.8/3.4 | 3.5/3.1 | 45 | 0.4 | 0.4 | 70 | 60 | 110 | 115 | 2.0 | very good |

[1]Measured on the unmetallized film
Side A: metallized outer layer
Side C: unmetallized 5. The polypropylene film of claim 1, wherein the film has a three-layer structure and is composed of an outward-facing outer layer A, the base layer B and a second outer layer C, which has been applied to the base layer B on its side facing away from the outer layer A.

6. The polypropylene film of claim 1, wherein the outer layer C has been pigmented.

7. The polypropylene film of claim 1, wherein the outer layer A has been pigmented.

8. The polypropylene film of claim 1, wherein at least one outward-facing outer layer has been corona-treated.

9. The polypropylene film of claim 1, wherein at least one outward-facing outer layer has been flame-treated.

10. The polypropylene film of claim 1, wherein at least one surface is metallized.

11. The polypropylene film of claim 1, wherein layer A additionally contains a layer of silicon.

12. The polypropylene film of claim 1, wherein the layer A additionally contains at least one oxidic layer comprising an oxide of an element of the $2^{nd}$, $3^{rd}$, or $4^{th}$ Main Group of the Periodic Table, or a combination thereof.

13. The polypropylene film of claim 1, wherein the oxygen barrier value of the metallized film is $\leq 30$ cm$^3$/(m$^2$ bar d).

14. The polypropylene film of claim 1, wherein the oxygen barrier value of the metallized film is $\leq 25$ cm$^3$/(m$^2$ bar d).

15. The polypropylene film of claim 1, further comprising an antistatic agent, an antiblocking agent, a lubricant, a stabilizer, a neutralizing agent, a resin, or a combination thereof.

16. A process for producing a biaxially oriented polypropylene film of claim 1, comprising (A) feeding polypropylene melts corresponding to the compositions of the outer and base layers to a coextrusion die;

(B) coextruding said polypropylene melts from the coextrusion die onto a chill roll to produce a prefilm; and (C) biaxially orienting and heat-setting the resultant prefilm, where at least one outward-facing outer layer has a number of elevations/protrusions N per mm$^2$ of film surface area which is related to their respective heights h and diameters d by the following equations $$\log N/mm^2 < A_h - B_h * \log h/\mu m, \quad 0.05 \ \mu m < h < 1.0 \ \mu m \quad (1)$$

$$A_h = 1.4; \ B_h = 2.5$$

$$\log N/mm^2 < A_d - B_d * \log d/\mu m, \quad 0.2 \ \mu m < d < 10 \ \mu m \quad (2)$$

$$A_d = 3.4; \ B_d = 2.4.$$

17. The process of claim 16, in which recycled material is fed to the extrusion die at a concentration of from 10 to 50% by weight, based on the total weight of the film.

18. The process of claim 16, wherein the biaxial orientation of the film is carried out sequentially.

19. The process of claim 16, wherein the sequential biaxial orientation is carried out by first orienting the prefilm in a longitudinal direction, and then in a transverse direction.

20. The process of claim 16, wherein the film is maintained on the chill roll at a temperature of from about 10° C. to about 100° C.

21. A method for packaging foodstuffs and other consumable items, which comprises packaging said foodstuffs and consumable items in a film as claimed in claim 1.

* * * * *